Dec. 7, 1965 F. A. DEXTER 3,222,575

CIRCUIT OVERLOAD PROTECTOR

Filed Oct. 29, 1962 2 Sheets-Sheet 1

INVENTOR.
FRED A. DEXTER

BY

Don D. Doty

ATTORNEYS

INVENTOR.
FRED A. DEXTER
BY
ATTORNEYS 3,222,575
CIRCUIT OVERLOAD PROTECTOR

Fred A. Dexter, 4715 Filipo St., San Diego, Calif.

Filed Oct. 29, 1962, Ser. No. 233,975
22 Claims. (Cl. 317—20)
(Granted under Title 35, U.S. Code (1952), sec. 266)

The invention described herein may be manufactured and used by or for the Government of the United States of America for governmental purposes without the payment of any royalties thereon or therefor.

The present invention relates generally to protective systems for electrical devices and in particular is a method and means for protecting electronic circuits against current overloading by an intelligence signal source associated therewith. In even more particular, it is an extremely rapid-acting overload protector which is highly effective in protecting transistorized, semi-conductor, super-conductor, solid-state physics, and other electronic circuits against dynamic overloads or short circuits by removing the input data signal supplied thereto by any given source or equipment within a minimum and safe time period.

Many prior art devices have been employed for the purpose of protecting the components of electrical and electronic circuits. For instance, such items as fuses, relays, circuit breakers, etc., have all been used to interrupt the current supply to any given apparatus in order to protect it from being adversely overloaded. However, in some instances, such items are unsatisfactory because they do not operate fast enough to remove the signal current from the electrical load in time to prevent destruction or damage of the electrical components incorporated in the circuit thereof. This is particularly true with respect to the devices intended to act as protectors of load circuits containing transistors, semi-conductors, super-conductors, and other solid-state physics elements. Moreover, in some instances, the prior art protection devices are overly complex in that they contain a large number of electrical and electronic components which, in turn, usually make them physically burdensome and expensive to manufacture and maintain.

The present invention overcomes most of these objectionable features, inasmuch as it is sufficiently rapid in its operation to protect all known types of electrical and electronic equipment, it is both relatively simple and economical to manufacture and maintain, and it requires a minimum of installation space.

It is, therefore, an object of this invention to provide an improved electrical circuit protection device.

Another object of this invention is to provide an improved method and means for electrically isolating an electrical load circuit from an alternating current signal source, in event the current therefrom reaches a predetermined level where a further increase thereof would jeopardize the operation of or destroy the electrical components incorporated therein.

Still another object of this invention is to provide an improved method and means for preventing the overload of electronic circuits without deleteriously affecting or loading the circuit involved.

Still another object of this invention is to provide an improved overload circuit protector which requires only a minimum of physical installation space.

A further objective of this invention is to provide an improved method and means for protecting transistorized electronic circuits or circuits containing other solid-state physics devices without the subject protector, itself, taking part in influencing, or adversely affecting the operation of the circuit involved.

Another object of this invention is to provide a dynamic microsecond overload protector for electrical and electronic circuits which may be easily and economically manufactured and maintained.

Other objects and many of the attendant advantages of this invention will readily be appreciated as the same becomes understood by reference to the following detailed description when considered in conjunction with the accompanying drawings wherein.

Figure 1:
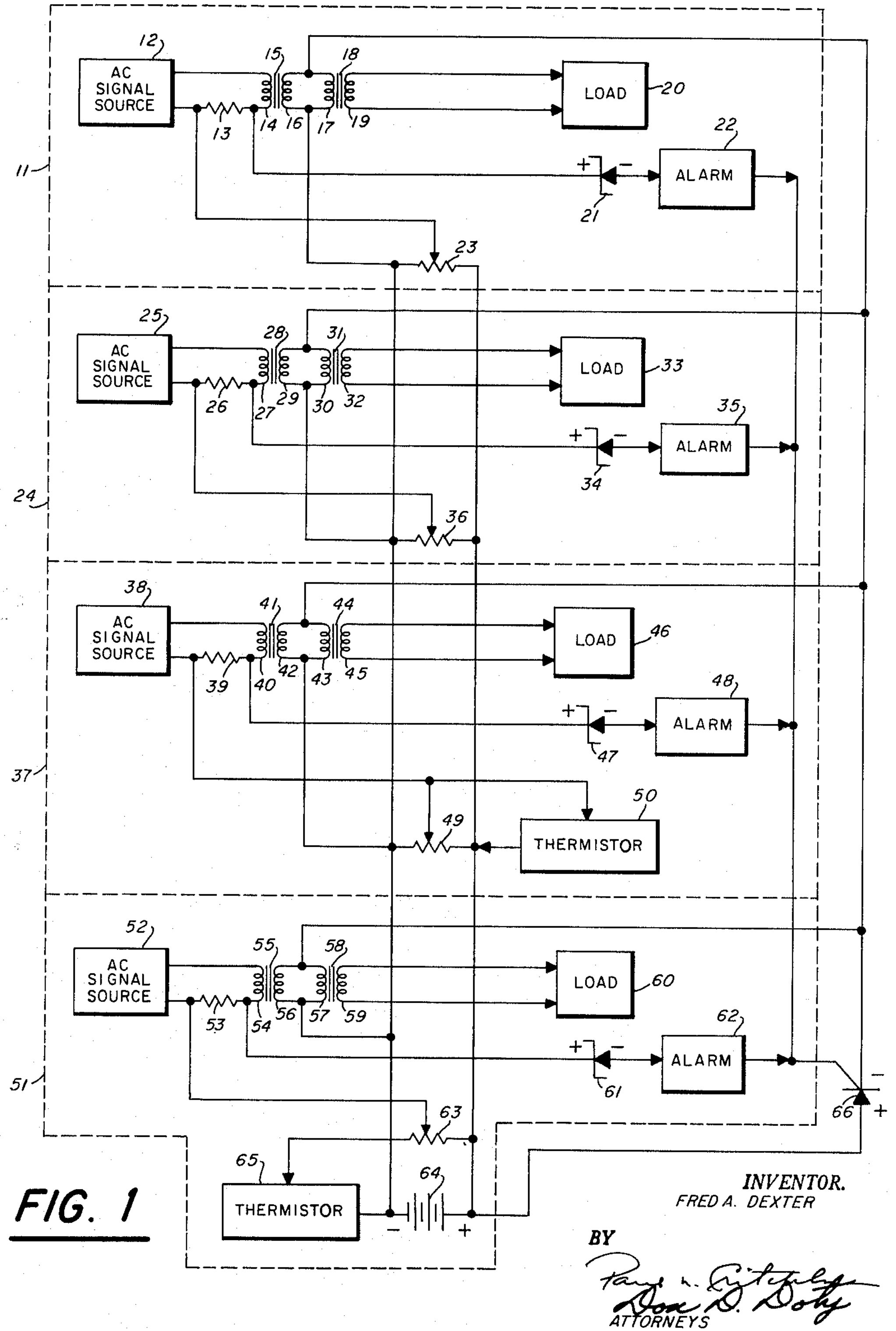
FIG. 1 is a diagram of the invention with the elements thereof represented in both block and schematic form in combination with the load it is intended to protect and the signal source intended to provide the input data signal to said load.

Referring now to FIG. 1, the invention is shown as it may be typically used in order to protect a plurality of predetermined electrical loads from being overloaded by a number of predetermined alternating current signal sources, respectively. In the first circuit 11 thereof, there is shown an alternating current signal source 12 coupled through a resistor 13 to the primary winding 14 of a transformer 15. A secondary winding 16 of transformer 15 is coupled to a primary winding 17 of transformer 18, with a secondary winding 19 thereof ultimately connected to an electrical load 20 which contains the aforementioned transistor, semi-conductor, super-conductor, or other solid-state physics elements to be protected. Connected to one terminal of said resistor 13 is the positive pole of a Zener diode 21 with the negative pole thereof coupled to an alarm 22. Alarm 22, of course, may be any appropriate type which warns a human or other operator that an overload condition exists and which functions as a result of a proper supply of electrical current being supplied thereto. The other terminal of the aforesaid resistor 13 is coupled to the slide arm of a potentiometer 23. One of the terminals of the resistance portion of said potentiometer 23 is connected to one of the terminals of the aforementioned interconnected secondary and primary windings 16 and 17 of transformers 15 and 18, respectively.

The second load circuit-protector combination 24 is shown in the dotted block as including an alternating signal source 25, the outputs of which are coupled through a current sensing means such as resistor 26 to a primary winding 27 of transformer 28. A secondary winding 29 of transformer 28 is coupled to a primary winding 30 of a transformer 31, with a secondary winding 32 thereof electrically coupled to another electrical load 33. One of the terminals of resistor 26 is connected to a positive pole of Zener diode 34, the negative pole of which is coupled to an alarm system 35. The other terminal of the aforementioned resistor 26 is connected to the slide arm of a potentiometer 36. One terminal of the resistance portion of potentiometer 36 is connected to one terminal of the aforesaid potentiometer 23 as well as to the aforesaid interconnected secondary winding 29 and primary winding 30 of transformers 28 and 31, respectively.

As can readily be seen, circuits 11 and 24 contain identically coupled and arranged components. Although only two of such circuits are shown in FIG. 1 of the drawing, it should be understood that any number thereof may be so included if desired.

Another circuit combination 37, somewhat similar to the aforesaid circuits 11 and 24 but not identical therewith, is depicted as including another alternating current signal source 38, the output of which is coupled through a current sensing means such as resistor 39 which, in turn, is connected to a primary winding 40 of a transformer 41. A secondary winding 42 of transformer 41 is electrically coupled to a primary winding 43 of a transformer 44, with a secondary winding 45 thereof coupled to another electrical load 46 of any appropriate predetermined type to be protected. As before, one of the terminals of resistor 39 is coupled to the positive pole of a Zener diode 47, the negative pole of which is coupled to an alarm 48 of any appropriate type. The other terminal of the aforementioned resistor 29 is coupled to the slide arm of a potentiometer 49 and to the input of a thermistor 50, which is of the type that decreases in resistance with an increase of the temperature ambient thereto. The output of thermistor 50 is coupled to one of the terminals of the resistance portion of each of the aforementioned potentiometers 49, 36 and 23. The other terminal of the resistance portion of potentiometer 49 is likewise coupled to the comparable terminal of said potentiometer 36 as well as to the interconnected secondary windings 42 and 43 of the aforesaid transformers 41 and 44.

Still another load circuit-protector combination 51 is illustrated as including another alternating current signal source 52 with the outputs thereof coupled through a current sensing means such as resistor 53 to a primary winding 54 of transformer 55. A secondary winding 56 of transformer 55 is likewise coupled to a primary winding 57 of a transformer 58, and a secondary winding 59 thereof is likewise coupled to the input of another electrical load 60 to be protected. One of the terminals of current sensing resistor 53 is coupled to the positive pole of a Zener diode 61, the negative pole of which is coupled to the input of another appropriate alarm system 62. Also, the other terminal of resistor 53 is coupled to the slide arm of a potentiometer 63. One of the terminals of the resistance portion of potentiometer 63 is connected to the similar terminals of the resistance portions of the aforementioned potentiometers 49, 36 and 23, as well as to the positive pole of a battery 64 or other variable direct current power source. Although the other terminals of the resistance portions of potentiometers 49, 36 and 23 are interconnected, they are not connected to the resistance portion of potentiometer 63 but, rather, are electrically coupled directly to the negative pole of the aforesaid battery 64. The remaining terminal of the resistance portion of potentiometer 63 is connected through a thermistor 65 to the negative pole of said battery 64. In this particular case, thermistor 65 is of the type that increases its resistance with an increase of ambient temperature.

Each of the other interconnected secondary and primary windings of the aforementioned transformers 15 and 18, 28 and 31, 41 and 44 and 55 and 58 are likewise interconnected and coupled to the negative pole of a controlled silicon rectifier 66. The positive pole of controlled silicon rectifier 66 is coupled to the positive pole of battery 64 and to the interconnected terminals of the resistance portion of potentiometers 23, 36, 49 and 63. The outputs of alarms 22, 35, 48 and 62 are likewise interconnected and also coupled to the gate or control element of the aforesaid controlled silicon diode 66.

Figure 2:
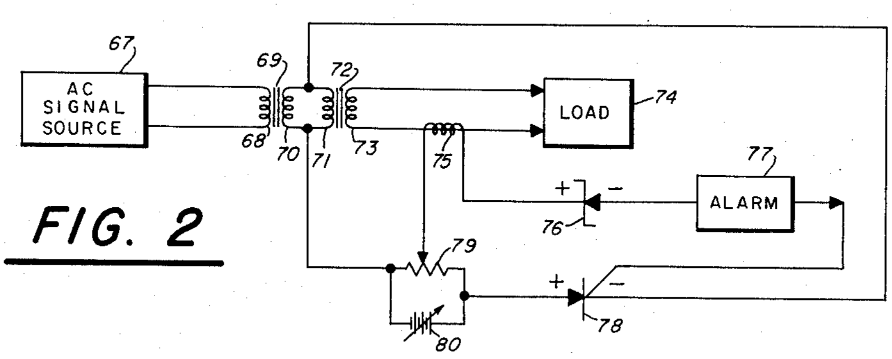
FIG. 2 is a diagrammatical representaton of a single embodiment of the subject invention.
Figure 3:
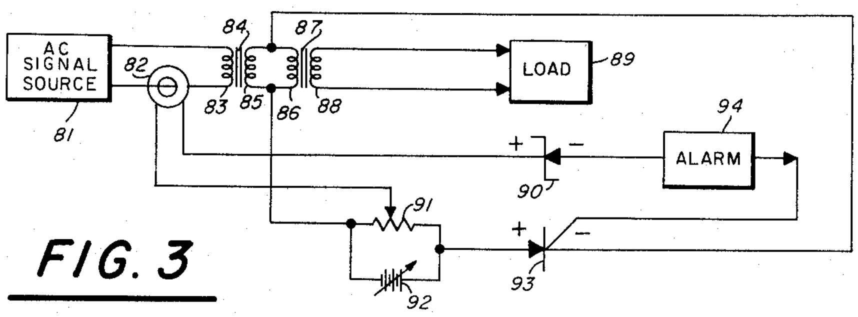
FIG. 3 is a diagrammatical representation of another embodiment of the subject invention.

With two exceptions the devices of FIGS. 2 and 3 are illustrated in an identical fashion. Specifically, FIGS. 2 and 3 each depict individual signal source-load-protector systems employing slightly different current sensing means which are respectively located at different positions in the devices thereof.

Considering now the device of FIG. 2 there is shown an alternating current signal source 67, the outputs of which are connected to a primary winding 68 of transformer 69. A secondary winding 70 of transformer 69 is connected to a primary winding 71 of transformer 72, with a secondary winding output 73 thereof electrically coupled to any appropriate electrical load 74 to be protected. A current sensing means 75 which in this case may be, for example, any suitable inductive coupling type of device which senses electrical current in a given line without adversely affecting or influencing the current flow thereof. One terminal of inductive current sensor 75 is coupled to the positive pole of a Zener diode 76 with the negative pole thereof coupled to the input of an alarm device 77. A controlled silicon rectifier 78 has its control terminal coupled to the output of said alarm 77. The negative pole thereof is electrically connected to the pair of the interconnected secondary and primary windings 70 and 71 of transformers 69 and 72. The positive pole thereof is coupled to a parallel connected potentiometer 79 and battery 80, with the interconnected negative pole of battery 80 and one of the terminals of the resistor portion of said potentiometer 79 being coupled to the other interconnected secondary and primary windings 70 and 71 of transformers 69 and 72.

The device of FIG. 3 also includes any given A.C. signal source 81 which is coupled through a toroidal wound transformer surrounding one of the leads thereof in inductive coupling therewith to a primary winding 83 of a transformer 84. A secondary winding 85 of transformer 84 is coupled to a primary winding 86 of a transformer 87, and a secondary winding 88 of transformer 87 is coupled to the inputs of any appropriate load which is desired to have current overload protection applied thereto. The outputs from the aforesaid toroidal wound transformer are respectively applied to the positive pole of a Zener diode 90 and a slide arm of a potentiometer 91. One of the terminals of a resistance portion of said potentiometer 91 is coupled to the interconnected secondary and primary windings 85 and 86 of transformers 84 and 87, as well as to the negative pole of a battery 92. The other terminal of potentiometer 91 is coupled to the positive pole of battery 92 and to the positive pole of a silicon controlled rectifier 93, the negative pole of which is coupled to the other interconnected terminals of secondary and primary windings 85 and 86 of transformers 84 and 87. The negative pole of the aforesaid Zener diode 90 is coupled through an alarm device having any suitable alarm characteristics which would warn a human operator that an overload condition exists, with the output thereof coupled to the control element of controllable silicon diode 93.

Figure 4:
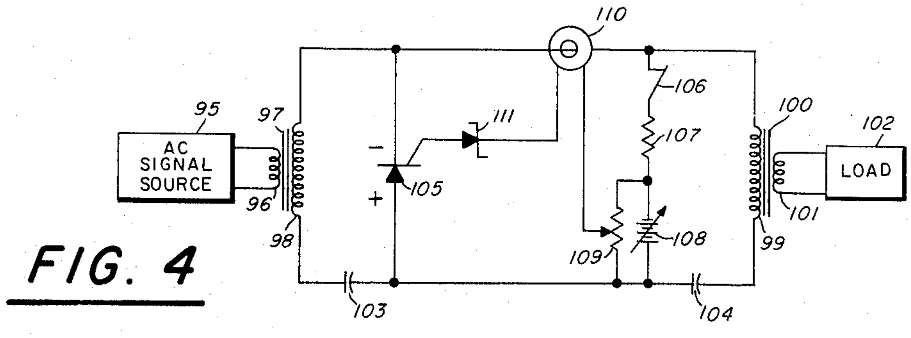
FIG. 4 is another diagrammatical representation of still another embodiment of the subject invention.

FIG. 4 represents another embodiment of the subject invention and is depicted as containing an alternating current signal source 95, the outputs of which are connected to a primary winding 96 of a transformer 97. A secondary winding 98 of said transformer 97 has one of the terminals thereof directly coupled to a primary winding 99 of another transformer 100, a secondary winding 101 of which is coupled to the input of any appropriate electrical load 102. The other terminal of secondary winding 98 of transformer 97 is coupled through a first capacitor 103, and a second capacitor 104 is connected in series with said capacitor 103 is also applied to the remaining terminal of secondary winding 99 of transformer 100. Connected across the two electrical leads of the interconnected transformers 97 and 100 is silicon control rectifier 105 with the positive pole thereof coupled to the joined terminals of said capacitors 103 and 104. Connected in parallel with the aforesaid silicon control rectifier 105 is a series circuit consisting of a normally closed switch 106, a resistor 107, and a battery or D.C. voltage supply 108 which is susceptible to having its voltage varied as desired either manually or automatically by some predetermined associated equipment. Connected in parallel with battery 108 is the resistant portion of a potentiometer 109. The slide arm thereof is coupled through a current sensing means 110, such as, for example, a toroidal wound transformer, a pick-off coil, or an appropriately installed conventional transformer, to the negative pole of a Zener diode 111. The positive pole of said Zener diode 111 is coupled to the gate or control element of the aforesaid silicon controlled diode 105.

Figure 5:
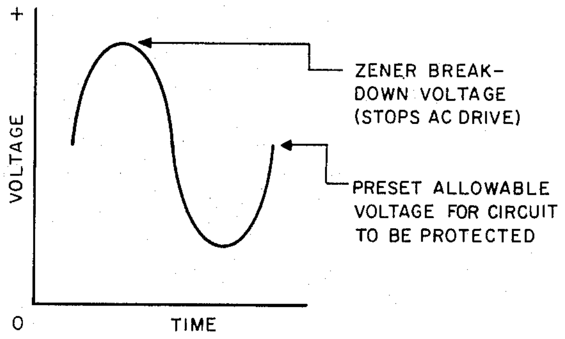
FIG. 5 is a graphical representation of a typical waveform of the input data signal upon which the subject invention will respond in order to provide protection to any given electrical load equipment.

FIG. 5 illustrates a typical waveform of the signal which may emanate from anyone or all of the foregoing alternating current signal sources. In this particular figure it is more or less idealized for the purpose of facilitating disclosure and explanation thereof. As can be seen, the waveform of FIG. 5 is substantially a sine wave with only one cycle illustrated. In event that the amplitude of said waveform exceeds some predetermined value, it automatically triggers the operation of the subject invention to electrically isolate the load from the A.C. signal source, as will be more fully explained in connection with the discussion of the operation thereof subsequently.

Briefly, the operation of the subject invention as embodied in the devices of FIGS. 1 through 3 is as follows:

The alternating current signal source which may, for example, be a sonar system, a radar system, a communications system, or any other system which produces an intelligence or data signal as an output therefrom which has a fluctuating amplitude characteristic. This output signal is then supplied through a pair of impedance matched back-to-back transformers to any particular electrical load adapted for utilizing said intelligence or data signal. In one of the lead lines either preceding, following or between said back-to-back transformers, a current sensing device is incorporated. While only several of such devices have been disclosed herein, it should be understood that any of many well-known current sensing and measuring devices may be employed, inasmuch as so doing would obviously be well within the purview of one skilled in the art having the benefit of the teachings herewith presented. With respect to FIGS. 1, 2, and 3, it can be seen that voltage drop resistors, inductive pickoff coils, and toroidal wound transformers are used, respectively. Of course, an appropriate ordinary transformer may also be substituted for any one of the current sensors so illustrated in the aforementioned figures so long as the current sensor used does not take part in or adversely affect the combined operation of the alternating signal source and the electrical load.

In event the alternating current signal source produces a data signal having excessive current or excessive amplitude at any given instant, an over-pulse is generated by the current sensing pickup coil and this pulse is supplied to the Zener diode where it is superimposed on the bias already present thereon. This causes the Zener diode to break into conduction and apply a voltage on the gate element of the controlled silicon rectifier which, in turn, cuts off the drive through the back-to-back transformers connected between the signal source and the electrical load. Actually, this is accomplished because the gate pulses received from the Zener diode will cause the control silicon rectifier to also conduct current through the input transformer winding, thus saturating the core thereof and stopping the alternating current from passing through the transformer. Of course, when this occurs, the driving power to the electrical load is interrupted and cut off and it will remain cut off until such time as the system is reset by turning it off by means of its regular electrical switch or a reset switch, as is customary in the electrical art. To reset the system, it only becomes necessary to interrupt the power feed to the silicon controlled rectifier, thereby placing it into a non-conductive state which causes the aforesaid transformer to no longer be in a saturated condition.

In actual practice, it is preferable that the bias be set on the Zener diode, or diodes as the case may be, just below the point of breaking into conduction. As shown, this arrangement is effected by means of the adjustable potentiometer type sensitivity control, but, of course, this could be readily replaced by a resistive voltage divider network if so desired. It has been found that the subject circuit is the most sensitive at this particular setting; however, adjustments may have to be made with respect thereto so as to produce optimum operation for any given combination of alternating current signal source and electrical load to be protected. But, as can readily be seen, only the smallest amount of voltage is needed to be produced by a current sensing pickup coil and added to the bias voltage already applied to the Zener diode to cause it to conduct and this condition is ordinarily effected by setting the bias on said diode or on each of the diodes employed just below the point that they break into conduction. Obviously, to make the current sensing device less sensitive, it is only necessary to set more bias on the Zener diodes so that more voltage from the pickup coil will have to be added to the existing bias thereof in order to cause it to conduct.

Accordingly, each of the potentiometers associated with their respective signal source-load circuit combination constitute sensitivity controls. In addition, however, the overall sensitivity may be controlled over a wide range by using a variable voltage power supply for the direct current power supply shown for all of the circuits.

Although the particular disclosure of FIG. 1 shows only four signal source-load combinations being protected by the subject overload protector, it should be understood that any number thereof may be so protected if desired. Moreover, also as shown in FIG. 1, each of the signal source-load circuits to be protected incorporate thermistors which provide temperature compensation in order to effect increased accuracy of operation and protect against excessive heat developed in the case of semiconductor circuits.

The device of FIG. 4 illustrates a method and means of using a control silicon rectifier as an alternating current switch while holding the current to a minimum. The alternating current signal to be controlled is supplied by the signal source and passes through the input transformer 97. One of the leads therefrom is directly coupled to the input of output transformer 100 and the other lead thereof is coupled through series connected capacitors 103 and 104 to the input of said transformer 100 also. When the current in the electrical lead to which the current sensing toroidal transformer is associated reaches a level at any given instant which exceeds a predetermined voltage set on potentiometer 109, the output pulse therefrom will overcome the bias of Zener diode 111 to apply a voltage to the control element of controlled silicon diode 105, thereby causing it to conduct and short-circuit the electrical leads between the aforesaid transformers. This, in effect, causes the shorting out of the alternating current signal across the transformer 97 which, in turn, causes the output of transformer 100 to drop to zero without having to saturate the cores of said transformers, as has been done in the devices of FIGS. 1 through 3. However, when the output of transformer 100 has dropped to zero, it can readily be seen that electrical load 102 has been effectively isolated from the input alternating current signal source that has caused the current overload in the first place.

Although FIG. 1 shows that a plurality of load circuits would be protected by simultaneous shut-down thereof in case any one of them were overloaded by its respective signal source, individual load circuits may be protected separately without shutting down associated equipment if so desired. Accordingly, the devices of FIGS. 2 through 4 illustrate the manner in which this operational arrangement may be effected. Of course, it would be obvious to the artisan to combine two or more of such circuits in such manner that the same direct current power source and/or sensitivity control potentiometer may be used to power and sensitivity control the protector portions thereof, since so doing would only necessitate making a parallel electrical hook-up to one set thereof in essentially the same way that the hook-up is made to the plurality thereof depicted in FIG. 1.

With respect to all of the devices of FIGS. 1 through 4, the A.C. signal source, the electrical loads, and all of the components incorporated in the subject circuit protector must so be matched as to provide a minimum of impedance losses within the combined circuitry thereof.

Furthermore, it should be understood that all of the elements included in the subject invention are well known and conventional per se, and that it is their unique arrangement, interconnection, and interaction which produces the new and useful results not obtained by the devices of the prior art.

Obviously, many modifications and variations of the present invention are possible in the light of the above teachings. It is, therefore, to be understood that within the scope of the appended claims the invention may be practiced otherwise than as specifically described.

What is claimed is:

1. An electrical circuit overload protector comprising in combination,
   means for producing an intelligence signal,
   a first transformer having a primary and a secondary winding,
   a second transformer having a primary winding and a secondary winding with the primary winding thereof connected to the secondary winding of said first transformer,
   an electrical load coupled to the secondary winding of said second transformer,
   a controllable diode connected in parallel with the interconnected secondary and primary windings of said first and second transformers,
   means inductively associated with at least one of said transformers for sensing the current passing therethrough and generating a voltage proportional thereto at any given instant,
   and means connected between said inductive sensing means and said controllable diode for gating said generated voltage to said controllable diode to effect conduction thereof when the sensed current of at least one of said transformers exceeds a predetermined level.

2. The device of claim 1 wherein said means for producing an intelligence signal is a sonar system.

3. The device of claim 1 wherein said means for producing an intelligence signal is a radar system.

4. The device of claim 1 wherein said means for producing an intelligence signal is a communications system.

5. The device of claim 1 wherein said controllable diode is a controlled silicon rectifier.

6. The device of claim 1 wherein said means inductively associated with at least one of said transformers for sensing the current passing therethrough is a tapped voltage-dropping resistor.

7. The device of claim 1 wherein said means inductively associated with at least one of said transformers for sensing the current passing therethrough is a pick-off coil.

8. The device of claim 1 wherein said means inductively associated with at least one of said transformers for sensing the current passing therethrough is a transformer.

9. The device of claim 1 wherein said means inductively associated with at least one of said transformers for sensing the current passing therethrough is a toroidal wound transformer.

10. The device of claim 1 wherein said means connected between said inductive sensing means on said controllable diode for gating said generated voltage to said controllable diode to effect conduction thereof when the sensed current of at least one of said transformers exceeds a predetermined level is a Zener diode.

11. The device of claim 1 wherein said electrical load comprises an amplifier.

12. The device of claim 1 wherein said electrical load comprises a computer system.

13. The device of claim 1 wherein said electrical load comprises a readout system.

14. The invention according to claim 1 further characterized by an alarm device interposed between said controllable diode and the aforesaid gating means.

15. The invention according to claim 1 further characterized by
   a battery connected between said controllable diode and one of the terminal junctions of said interconnected secondary and primary windings of the aforesaid first and second transformers,
   and a potentiometer having a resistance portion and a slide arm with the resistance portion thereof connected in parallel with said battery and the slide arm thereof coupled to the aforesaid current sensing means.

16. The invention according to claim 1 wherein one of the interconnections of said secondary and primary windings of said first and second transformers is further characterized by having at least one capacitor inserted therebetween.

17. The invention according to claim 1 further characterized by a variable direct current power source connected in series with the aforesaid controllable diode.

18. The device of claim 17 wherein said variable direct current power source connected in series with the aforesaid controllable diode is a battery.

19. An electrical circuit overload protector comprising in combination,
   means for producing a data signal,
   a pair of impedance matched transformers joined to each other in cascaded arrangement,
   a controllable diode connected to said pair of impedance matched transformers in such manner as to be capable of shorting at their interconnecting junctions,
   means inductively coupled with one of said pair of impedance matched transformers for sensing the current passing therethrough and generating a voltage proportional therethrough,
   gating means having a predetermined breakdown voltage level which is nonconductive until said predetermined breakdown voltage occurs connected between one of the outputs of said current sensing means and the aforesaid controllable diode,
   a variable direct current power source interposed between one of the interconnecting junctions of said pair of impedance matched transformers and said controllable diode,
   and a potentiometer having a resistance portion and a slide arm with the resistance portion thereof connected in parallel with said variable direct current power source and the slide arm thereof coupled to the other output of said current sensing means.

20. The invention according to claim 19 further characterized by thermistor means connected to said battery and said potentiometer for compensation of variations in the temperature ambient thereto.

21. An electrical circuit overload protector comprising in combination,
   an A.C. signal source,
   a first transformer incorporating a primary winding having a pair of terminals and a secondary winding having a pair of terminals,
   said pair of terminals of the primary winding of said first transformer coupled to the outputs of said A.C. signal source, said pair of terminals of the primary winding of said second transformer effectively coupled to said pair of terminals of the secondary winding of said first transformer,
   an electrical load having a pair of inputs respectively connected to said pair of terminals of the secondary winding of said secondary transformer, means interposed between said A.C. signal source and said electrical load for sensing the current flowing therebetween, a pair of series connected capacitors connected between one of the terminals of the secondary winding of said first transformer and one of the terminals of the primary winding of said second transformer, and means connected to said current sensing means and between the junction of said series connected capacitors and the other interconnected terminals of the secondary and primary windings of said first and second transformers for simultaneously shorting out the secondary winding of said first transformer and the primary winding of said second transformer when the current sensed by said current sensing means exceeds a predetermined value.

22. The device of claim 21 wherein said means connected across the junction of said series connected capacitors and the other interconnected terminals of the secondary and primary windings of said first and second transformers for simultaneously shorting out the secondary winding of said first transformer and the primary winding of said second transformer when the current sensed by said current sensing means exceeds a predetermined value comprises, a controlled silicon diode, a series circuit, including a switch, a resistor, and a battery, connected in parallel with said controlled silicon diode, a potentiometer having a resistance portion and a slide arm with the resistance portion thereof connected in parallel with said battery and the slide arm coupled to one of the output of said current sensing means, and a Zener diode interposed between the other output of said current sensing means and the control element of said controlled silicon diode.

References Cited by the Examiner

UNITED STATES PATENTS

| | | | |
|---|---|---|---|
| 1,200,796 | 10/1916 | Arnold | 317—20 X |
| 3,096,475 | 7/1963 | Brooks | 317—33 X |

SAMUEL BERNSTEIN, *Primary Examiner.*